(12) United States Patent
Nakamura

(10) Patent No.: US 7,149,785 B1
(45) Date of Patent: Dec. 12, 2006

(54) INFORMATION PROCESSING APPARATUS AND METHOD AND RECORDING MEDIUM

(75) Inventor: Ikuo Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 757 days.

(21) Appl. No.: 09/714,016

(22) Filed: Nov. 16, 2000

(30) Foreign Application Priority Data

Nov. 17, 1999 (JP) .................................. 11-326243

(51) Int. Cl.
| G06F 15/16 | (2006.01) |
| G06F 3/00 | (2006.01) |
| G06F 9/44 | (2006.01) |
| G06F 9/46 | (2006.01) |
| G06F 13/00 | (2006.01) |

(52) U.S. Cl. ...................................... 709/208; 719/321
(58) Field of Classification Search ................ 709/208, 709/211; 719/321–327; 710/8
See application file for complete search history.

(56) References Cited

U.S. PATENT DOCUMENTS

| 5,764,930 | A  | * | 6/1998  | Staats ........................... 710/107 |
| 6,345,319 | B1 | * | 2/2002  | Lin et al. ......................... 710/8 |
| 6,366,964 | B1 | * | 4/2002  | Shima et al. ................... 710/8 |
| 6,421,069 | B1 | * | 7/2002  | Ludtke et al. ............... 345/762 |
| 6,668,376 | B1 | * | 12/2003 | Wang et al. .................. 717/178 |
| 6,698,021 | B1 | * | 2/2004  | Amini et al. ................ 725/105 |
| 2002/0018124 | A1 | * | 2/2002  | Mottur et al. ............... 348/211 |
| 2002/0135677 | A1 | * | 9/2002  | Noro et al. .................. 348/143 |
| 2002/0147795 | A1 | * | 10/2002 | Cantwell ..................... 709/220 |
| 2003/0189649 | A1 | * | 10/2003 | Kuno ....................... 348/211.1 |

OTHER PUBLICATIONS

Raychaudhuri, Dipankar et al, "WATMnet: A Prototype Wireless ATM System for Multimedia Personal Communication," Jan. 1997, IEEE, vol. 15, No. 1, pp. 83-94.*

* cited by examiner

*Primary Examiner*—Jason Cardone
*Assistant Examiner*—Azizul Choudhury
(74) *Attorney, Agent, or Firm*—Finnegan, Henderson, Farabow, Garrett & Dunner, L.L.P.

(57) ABSTRACT

There is provided an information processing apparatus for controlling another electronic apparatus through a network, comprising: retrieving means for retrieving information associated with control over another electronic apparatus; storage means for storing a plurality of pieces of the information retrieved by the retrieving means; selecting means for selecting a desired piece of information from among the plurality of pieces of information; registration means for registering the desired piece of information as only information that can control another electronic apparatus on the network; and control means for controlling another electronic apparatus on the basis of the desired piece of information registered by the registration means.

14 Claims, 16 Drawing Sheets

FIG. 9

| API Code | DCM Name | Version | Status |
|---|---|---|---|
| 0x000e | SONY ZZZ with 3D | 1.1 | NonActive |
| 0x000e | SONY ZZZ with JAVA | 1.0 | NonActive |
| 0x000e | SONY ZZZ | 1.12 | Active |
| 0x000e | SONY ZZZ | 1.15 | NonActive |

FIG.13

| API Code | DCM Name | Version | Status |
|---|---|---|---|
| 0×000e | SONY ZZZ with 3D | 1.1 | NonActive |
| 0×000e | SONY ZZZ with JAVA | 1.0 | NonActive |
| 0×000e | SONY ZZZ | 1.12 | NonActive |
| 0×000e | SONY ZZZ | 1.15 | Active |

FIG. 14

| API Code | DCM Name | Version | Status |
|---|---|---|---|
| 0×000e | SONY ZZZ with 3D | 1.1 | NonActive |
| 0×000e | SONY ZZZ with JAVA | 1.0 | NonActive |
| 0×000e | SONY ZZZ | 1.15 | Active |

INFORMATION PROCESSING APPARATUS AND METHOD AND RECORDING MEDIUM

BACKGROUND OF THE INVENTION

The present invention relates generally to an information processing apparatus, an information processing method, and recording medium and, more particularly, to an information processing apparatus, an information processing method, and a recording medium which store plural pieces of information associated with control of other electronic apparatuses, select a desired piece of information from the stored pieces of information, and control the other electronic apparatuses on the basis of the selected information.

With home network systems such as the IEEE (Institute of Electrical and Electronics Engineers) 1394 serial bus, plural electronic apparatuses (for example, IRD (Integrated Receiver Decoder) and DVCR (Digital Video Cassette Recorder)) are interconnected to transmit/receive information therebetween for information reproduction and recording. With the IEEE 1394 serial bus, a controlling electronic apparatus issues an AV/C (Audio Video/Control) command to a controlled electronic apparatus for controlling it.

For the middleware for hiding AV/C commands for from various application software programs, HAVi (Home Audio/Video interoperability) architecture (trademark) is known. According to this HAVi, electronic apparatuses are controlled by a device control module (DCM).

Conventionally, in order to avoid control conflict, only one apparatus control is available for one electronic apparatus (under control) although two or more control apparatuses have two or more DCMs of different versions on a single network.

Consequently, some control apparatuses do now allow users to selectively use desired capabilities of these control apparatuses; namely, there is no other way for users to accept what is given as it is by these control apparatuses.

SUMMARY OF THE INVENTION

It is therefore an object of the present invention to provide an information processing apparatus, an information processing method, and a recording medium which allow users to select a desired device control module from among plural device control modules to control electronic apparatuses under control.

In carrying out the invention and according to one aspect thereof, there is provided an information processing apparatus for controlling another electronic apparatus through a network, comprising: retrieving means for retrieving information associated with control over another electronic apparatus; storage means for storing a plurality of pieces of the information retrieved by the retrieving means; selecting means for selecting a desired piece of information from among the plurality of pieces of information; registration means for registering the desired piece of information as only information that can control another electronic apparatus on the network; and control means for controlling another electronic apparatus on the basis of the desired piece of information registered by the registration means.

The above-mentioned information processing apparatus further comprises display control means for controlling display of the plurality of pieces of information stored in the storage means.

The storage means of the above-mentioned information processing apparatus comprises information distinguishing means for distinguishing the desired piece of information selected by the selecting means from other information not selected by the selecting means.

The above-mentioned information processing apparatus further comprises deletion determining means for determining whether to delete the desired piece of information and deleting means for deleting the desired piece of information if the same is determined for deletion by the deletion determining means.

The retrieving means of the above-mentioned information processing apparatus retrieves the information associated with control of another electronic apparatus from a predetermined recording medium in accordance with a predetermined procedure.

The network of the above-mentioned information processing apparatus is constituted by an IEEE. 1394 serial bus.

The retrieving means of the above-mentioned information processing apparatus retrieves the information associated with control of another electronic apparatus from another electronic apparatus in accordance with a predetermined procedure.

The predetermined procedure of the above-mentioned information processing apparatus is executed when one of events takes place, the events being connection of another electronic apparatus to the network and occurrence of a bus reset.

The selecting means of the above-mentioned information processing apparatus makes the selecting operation when one of events takes place, the events being connection of another electronic apparatus to the network and occurrence of a bus reset.

The selecting means of the above-mentioned information processing apparatus selects information having a most recent version as the desired piece of information from among the plurality of pieces of information stored in the storage means.

The retrieving means of the above-mentioned information processing apparatus comprises determination means for determining an identification code of the desired piece of information, wherein, if the identification code is found a new identification code, the retrieving means retrieves the information.

The identification code of the above-mentioned information processing apparatus is an application programming interface code.

The identification code of the above-mentioned information processing apparatus is a version name.

An information processing method for an information processing apparatus for controlling another electronic apparatus through a network, the method comprising the steps of: retrieving information associated with control over another electronic apparatus; storing a plurality of pieces of the information retrieved in the retrieving step; selecting a desired piece of information from among the plurality of pieces of information; registering the desired piece of information as only information that can control another electronic apparatus on the network; and controlling another electronic apparatus on the basis of the desired piece of information registered in the registration step.

A recording medium recording a computer-readable program for information processing for controlling another electronic apparatus through a network, the program comprising the steps of: retrieving information associated with control over another electronic apparatus; storing a plurality of pieces of the information retrieved in the retrieving step; selecting a desired piece of information from among the plurality of pieces of information; registering the desired piece of information as only information that can control another electronic apparatus on the network; and controlling another electronic apparatus on the basis of the desired piece of information registered in the registration step.

The information processing apparatus, information processing method, and the programs recorded on a recording medium retrieve plural pieces of information associated with controlling other electronic apparatuses, store the retrieved plural pieces of information, select a desired piece of information from these plural pieces of information, register the selected information as only the information that can control other electronic apparatuses on a network, and control other electronic apparatuses on the basis of the registered information. This novel constitution allows the user to control electronic apparatuses by use of desired device control modules and specifically manage the versions of these device control modules.

BRIEF DESCRIPTION OF THE DRAWINGS

These and other objects of the invention will be seen by reference to the description, taken in connection with the accompanying drawing, in which:

FIG. 9 is a diagram illustrating a version management table;

FIG. 13 is a diagram illustrating an exemplary version management table;

FIG. 14 is a diagram illustrating another exemplary version management table;

DETAILED DESCRIPTION OF PREFERRED EMBODIMENTS

This invention will be described in further detail by way of example with reference to the accompanying drawings.

Figure 1:
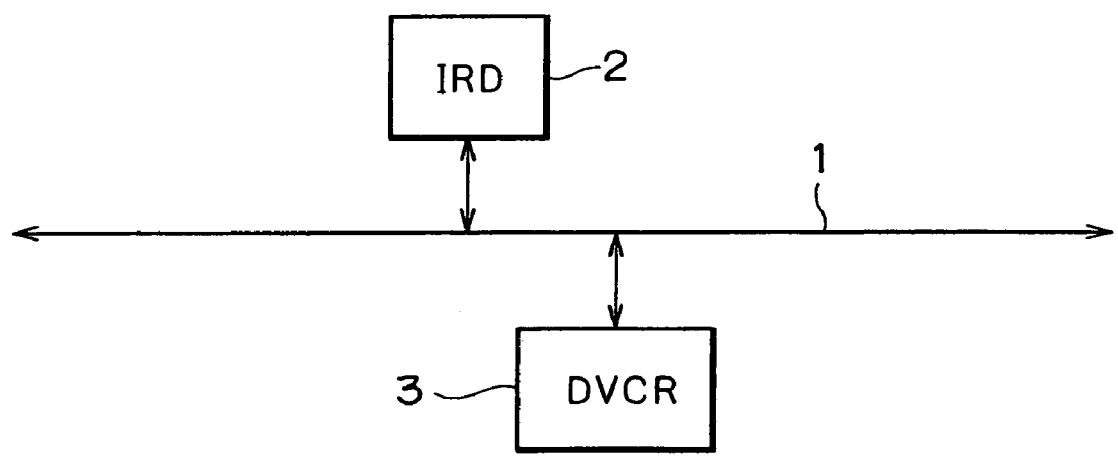
FIG. 1 is a block diagram illustrating an exemplary configuration of a network system to which the present invention is applied.

Now, referring to FIG. 1, there is shown a configuration of a home network system. This system comprises an IRD 2 and a DVCR 3 which are connected to an IEEE 1394 serial bus 1. When connected to the IEEE 1394 serial bus 1, the DVCR 3 sends a DCM (Device Control Module) and an FCM (Functional Component Module) to be described later to the IRD 2 through the IEEE 1394 serial bus 1. From the received information (DCM and FCM), the IRD 2 detects a connection state of apparatuses connected to the IEEE 1394 serial bus and displays a GUI (Graphical User Interface) for controlling the connected apparatuses onto a built-in LCD (Liquid Crystal Display) 29 (refer to FIG. 2).

Based on the information displayed on the LCD 29, the user operates a touch pad 28 (refer to FIG. 2) attached to the IRD 2 to specify processing to be executed by the DVCR 3 connected to the IEEE 1394 serial bus 1. Based on the command given by the user, the IRD 2 generates a control signal and supplies it to the DVCR 3 through the IEEE 1394 serial bus 1. Based on the received control signal, the DVCR 3 executes the processing such as recording or reproduction of video or audio data for example.

Figure 2:
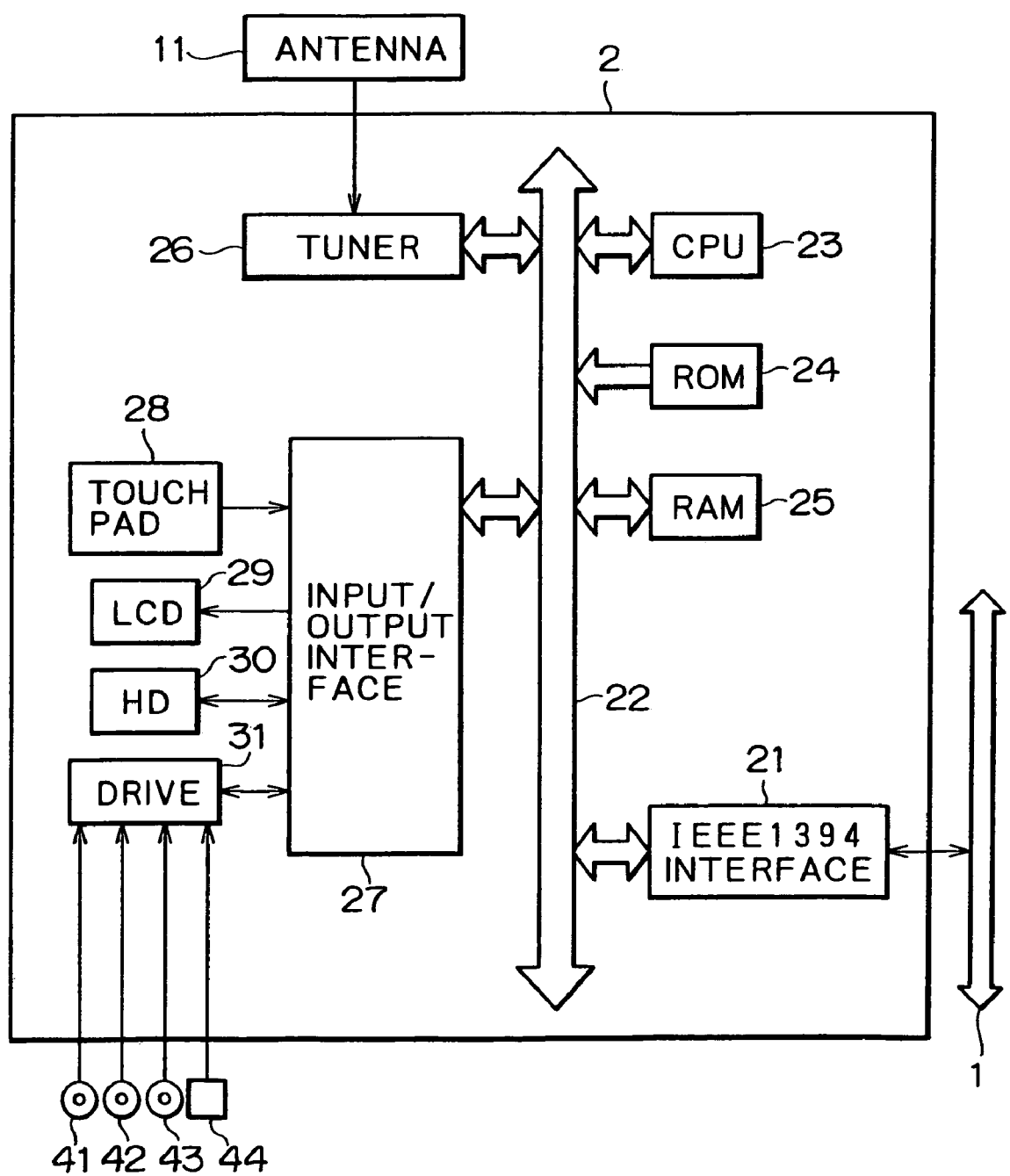
FIG. 2 is a block diagram illustrating an exemplary configuration of an IRD shown in FIG. 1.

The IRD 2 is configured as shown in FIG. 2 for example. A signal sent from the DVCR 3 is inputted in a CPU (Central Processing Unit) 23 via the IEEE 1394 serial bus 1, an IEEE 1394 interface 21, and an internal bus 22. When the touch pad 28 is operated by the user, a signal indicative of the operation is inputted in the CPU 23 via an input/output interface 27 and the internal bus 22. The touch pad 28 can be operated according to messages shown on the LCD 29. It should be noted that the IRD 2 may be operated by not only the touch pad 28 but also a remote control, not shown.

According to the received signal, the CPU 23 reads a program from a ROM 24 or a hard disk (HD) 30 and executes it and outputs a result of the execution to the LCD 29 through the input/output interface 27 for display thereon. Besides, the CPU 23 generates character image data representing a message for assisting user operation for example and outputs the generated data to the LCD 29 through the internal bus 22 and the input/output interface 27 for display and generates a control signal for controlling the DVCR 3 and sends the generated control signal to the DVCR 3 through the internal bus 22, the IEEE 1394 interface 21, and the IEEE 1394 serial bus 1. A RAM 25 temporarily stores the programs to be executed by the CPU 23, the data generated by the execution of these programs, and data necessary for DVCR 3 to execute particular processing.

An antenna 11 supplies a received satellite broadcast signal to a tuner 26 of the IRD 2. The tuner 26 receives a signal of a channel specified by the CPU 23. The hard disk 30 stores various application and middleware programs to be executed by the CPU 23. Besides, the hard disk 30 stores a version management table associated with the apparatus under control (namely, the DVCR 3) (to be specifically described later). A drive 31 can accommodate a magnetic disc 41, an optical disc 42, a magneto-optical disc 43, and/or a semiconductor memory 44.

Figure 3:
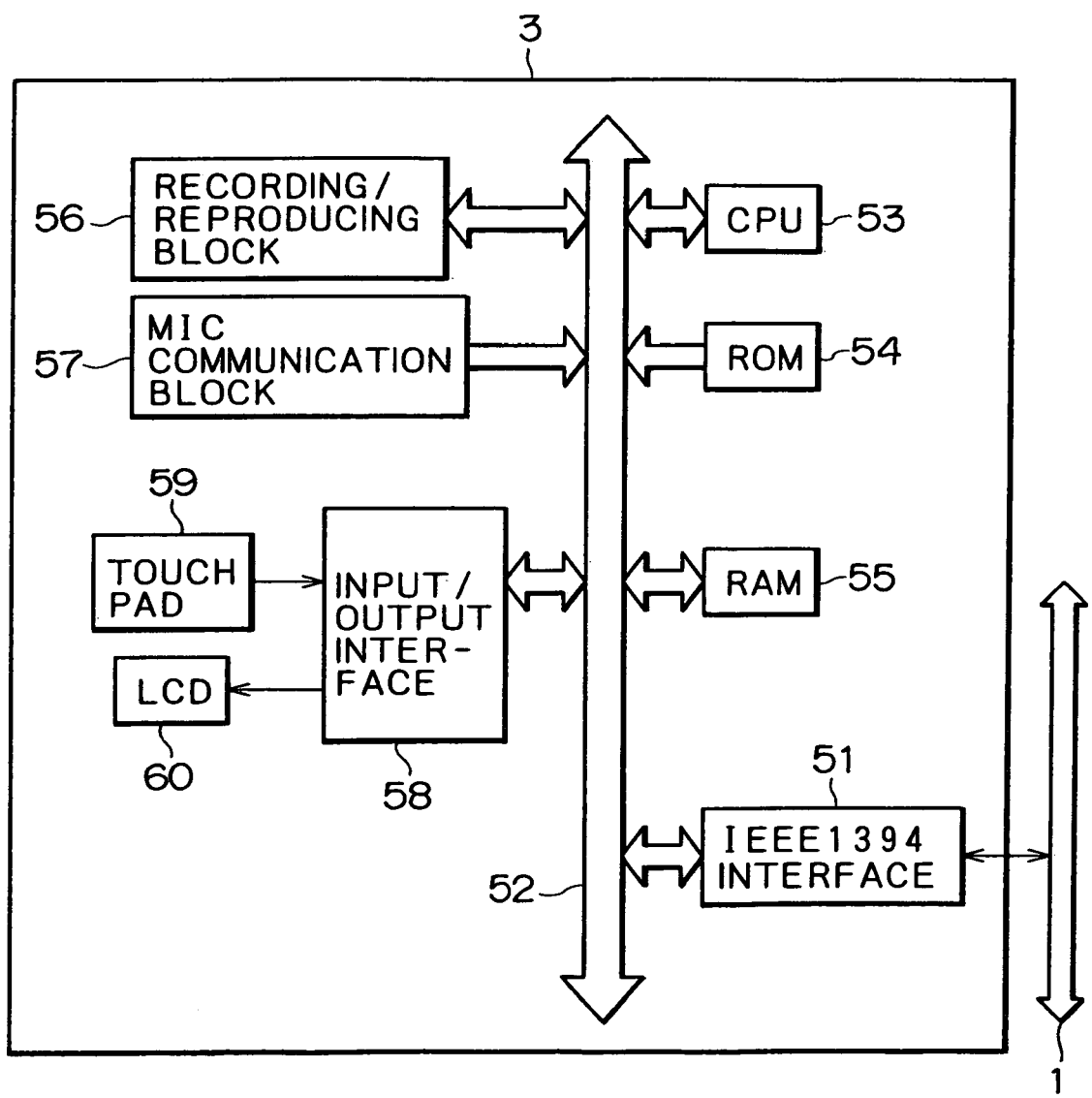
FIG. 3 is a block diagram illustrating an exemplary configuration of a DVCR shown in FIG. 1.

FIG. 3 shows an example of the internal configuration of the DVCR 3. A signal sent from the IRD 2 is inputted in a CPU 53 through the IEEE 1394 serial bus 1, an IEEE 1394 interface 51, and an internal bus 52. When the user operates a touch pad 59, a corresponding signal is inputted in the CPU 53 through an input/output interface 58 and the internal bus 52.

On the basis of the inputted signal, the CPU 53 reads a specified program from a ROM 54 to execute it, sends a control signal to a recording/reproducing block 56 through the internal bus 52, and sends own DCM and FCM stored in the ROM 54 to the IRD 2 through the internal bus 52, the IEEE 1394 interface 51, and the IEEE 1394 serial bus 1. A RAM 55 temporarily stores the programs to be executed by the CPU 53, the data generated by the execution of these programs, and other data necessary for the DVCR 3 to execute particular processing.

On the basis of the control signal supplied from the CPU 53, the recording/reproducing block 56 reads data from a loaded recording medium (in this case, a video cassette tape), not shown, and sends the data to the IRD 2 through the internal bus 52, the IEEE 1394 interface 51, and the IEEE 1394 serial bus 1 or to an LCD 60 for display thereon through the internal bus 52 and an input/output interface 58. In addition, the recording/reproducing block 56 records the data supplied from the IRD 2 through the IEEE 1394 serial bus 1, the IEEE 1394 interface 51, and the internal bus 52 onto the video cassette tape, not shown.

A MIC (Memory In Cassette) communication block 57 communicates with a MIC constituted by a semiconductor memory or a Memory Stick (trademark) for example mounted on the video cassette tape loaded in the DVCR 3 and detects information recorded in the MIC. The MIC records an ID (identification number) unique to this video cassette tape. Reading this ID from the MIC through the internal bus 52, the CPU 53 can detect the change of video cassette tapes loaded in the DVCR 3. Further, the ID recorded on the MIC is supplied to the IRD 2 through the internal bus 52, the IEEE 1394 interface 51, and the IEEE 1394 serial bus. Consequently, the IRD 2 can confirm the video cassette tape loaded in the DVCR 3.

It should be noted that, for the apparatuses such as arranged on a network shown in FIG. 1 to operate in a cooperative manner, middleware (the software located between the lower software such as the OS, network control program, or database system and the upper software such as application programs to provide various services to the application software) for controlling and managing the network is required. In addition, for the network connected with apparatuses of different makes to operate normally for the cooperation of these apparatuses, the common specifications on which the middleware depends are indispensable. For the middleware for network control and management, a network system based on HAVi (trademark) will be described below.

Figure 4:
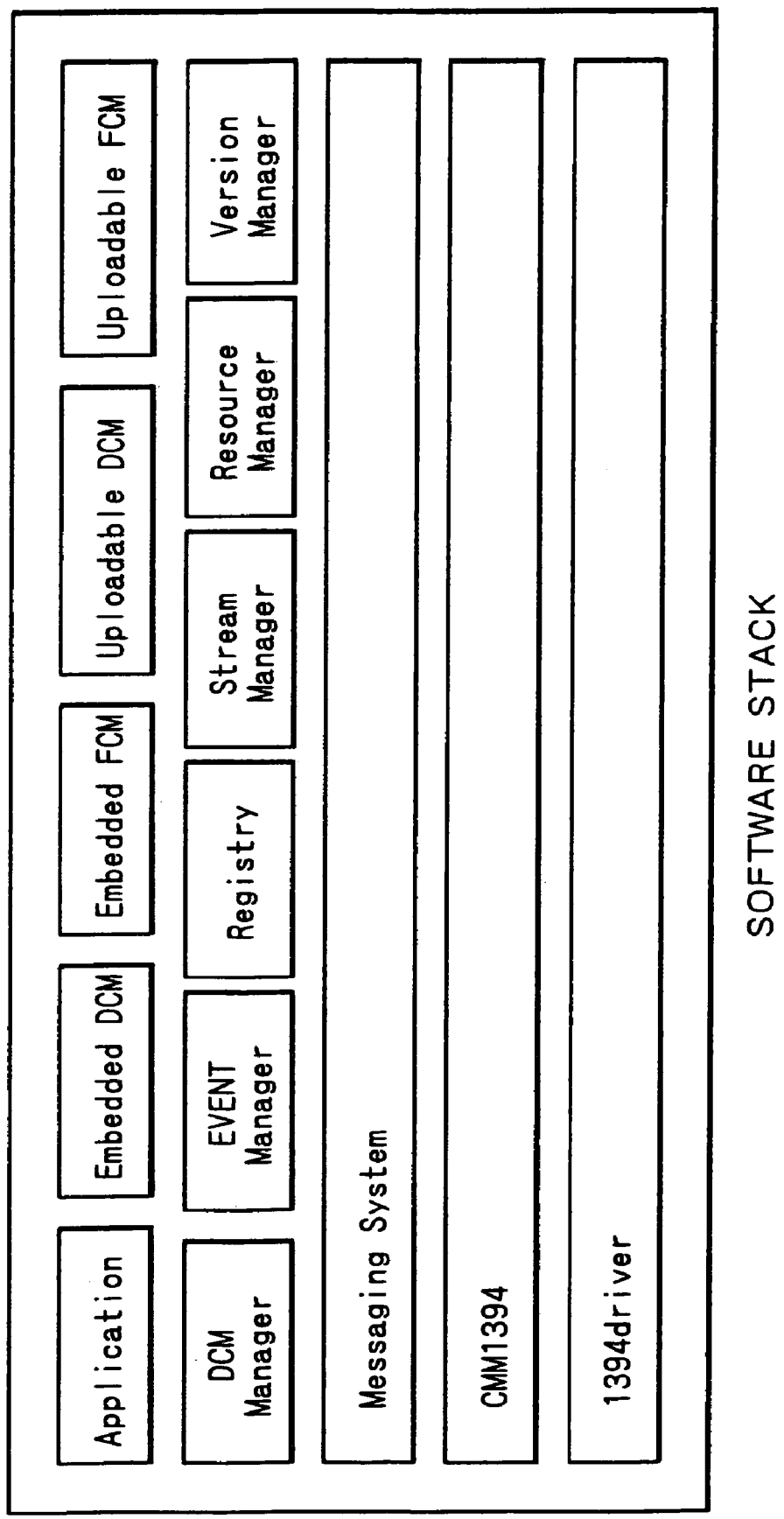
FIG. 4 is a diagram illustrating a software stack stored on a hard disk shown in FIG. 2.

FIG. 4 shows a software stack by way of example stored on the hard disk 30 of the IRD 2 shown in FIG. 2. In the figure, the upper modules are considered higher in hierarchy that the lower modules. The portions except for a 1394 driver and an application form the software modules for HAVi.

The 1394 driver is a module describing a portion dependent on the IEEE 1394 serial bus 1, providing a common procedure for device access to the upper software modules. The CMM (Communication Media Manager) 1394 acts as interface between the IEEE 1394 serial bus 1, each HAVi software module, and the application software. The CMM 1394 provides a transfer facility for transmitting/receiving signals between the apparatuses connected to the IEEE 1394 serial bus 1, keeps track of the operations of the IEEE 1394 serial bus 1, and supplies the information thereof to other software modules.

A messaging system operates as API (Application Programming Interface) for the communication between the software modules of the apparatuses connected to the network, transferring messages between the software modules. Consequently, with a HAVi-based network, message transmitting and receiving sides can transfer messages without knowing the location in network of the other side.

A DCM manager uploads a DCM and an FCM to be described later to each apparatus connected to the network. When a HAVi-based network is newly connected with an apparatus, the DCM manager uploads a corresponding uploadable DCM and a corresponding uploadable FCM to the newly connected apparatus.

An event manager generates an event when an apparatus is newly connected to the network or an apparatus is disconnected therefrom to cause a network status change, transmitting the event to the other software modules. This allows the HAVi-based network to realize plug-and-play functionality.

A registry holds or updates apparatus-associated information about what kinds of apparatuses are connected to the network and what functions these apparatuses have for example, thereby allowing the interaction between different apparatuses. Each application program retrieves necessary information from this registry. Referencing the registry, each apparatus on the network can check the locations of the basic software modules of the other apparatuses on the network.

A stream manager monitors and manages the flow of stream data (namely, continuous data) such as video and audio data on the network to allow the realtime transfer of stream data. In addition, the stream manager manages the connections inside and between apparatuses to allocate and free network resources and provides the connection information of the entire network. Further, the stream manager can support the reconnection to be executed after a bus reset operation of the network.

A resource manager handles the conflict in apparatus use right, manages scheduled events such as processing reserved for connected apparatuses, and monitors the network to check if there is the disconnection of an apparatus after its registration. A version manager according to the invention manages the versions of plural registered DCMs.

The application reads a DCM for controlling a particular apparatus connected to the network, selects a desired DCM from among plural DCMs having different versions, and updates the version management table for managing DCM versions (the version management table will be detailed later).

DCMs are unique modules for controlling apparatuses. An embedded DCM is a module which has been uploaded from the DVCR 3 and embedded in the IRD 2 or embedded from the beginning. An Uploadable DCM is a module uploaded from the DVCR 3 and having a different version. The uploadable DCM may later become an embedded DCM. The application program does not directly control each apparatus connected to the network but controls each apparatus by means of a corresponding DCM. An embedded FCM is a module which has been uploaded from the DVCR 3 and embedded in the IRD 2 or embedded from the beginning. An uploadable FCM is a module uploaded from the DVCR 3. These FCMs represent the contents (or functions) of control to be executed by the application program on each apparatus, an AV/C command being sent to the apparatus specified by the DCM. Namely, only an FCM can control an apparatus specified by a DCM.

Both DCM and FCM function as the API, so that the application program itself need not take the difference between apparatuses into account. Therefore, with a HAVi-based network, each apparatus on the network can recognize the functions of the other apparatuses, thereby allowing each apparatus to operate other apparatuses from a remote location. It should be noted that, in order to clarify whether the DCMs and FCMs have already been uploaded to the IRD 2, these DCMs and FCMs are expressed as an embedded DCM, an uploadable DCM, embedded FCM, and uploadable FCM. Each of these modules has been uploaded from the same apparatus (DVCR 3) and has a different version.

The above-mentioned software modules are owned by each apparatus connected to the network in accordance with an apparatus class specified in HAVi. In HAVi, the above-mentioned four types of apparatus classes are specified.

A FAV (Full AV Device) is compatible with apparatuses having a network managing function and has all the above-mentioned HAVi software modules (the FAV may have neither DCM nor FCM; if so, they may be installed by a BAV to be described later) The FAV can execute applications using Java (trademark) employed as HAVi byte code. Therefore, the FAV can own the DCM and FCM of other apparatuses. By doing so, the FAV can control these apparatuses.

An IAV (Intermediate AV Device), like the FAV, is compatible with apparatuses having a network managing function. Unlike the FAV, however, the IAV is an environment in which applications based on Java employed as HAVi byte code cannot be executed, so that the DCMs and FCMs of other apparatuses are already embedded.

A BAV (Base AV Device) is compatible with apparatuses under control which can be connected directly to HAVi-based networks and has the DCMs and FCMs of its own. A LAV (Legacy AV Device) has only a function as an apparatus that can be connected to the IEEE 1394 serial bus 1. Because it is compatible with AV/C commands, the LAV can operate not only as a standalone apparatus but also as an apparatus under control.

Herein, the IRD 2 is described as corresponding to the FAV (the IEEE 1394 interface 21 corresponds to the 1394 driver and the CMM 1394) and the DVCR 3 as corresponding to the BAV.

Figure 5:
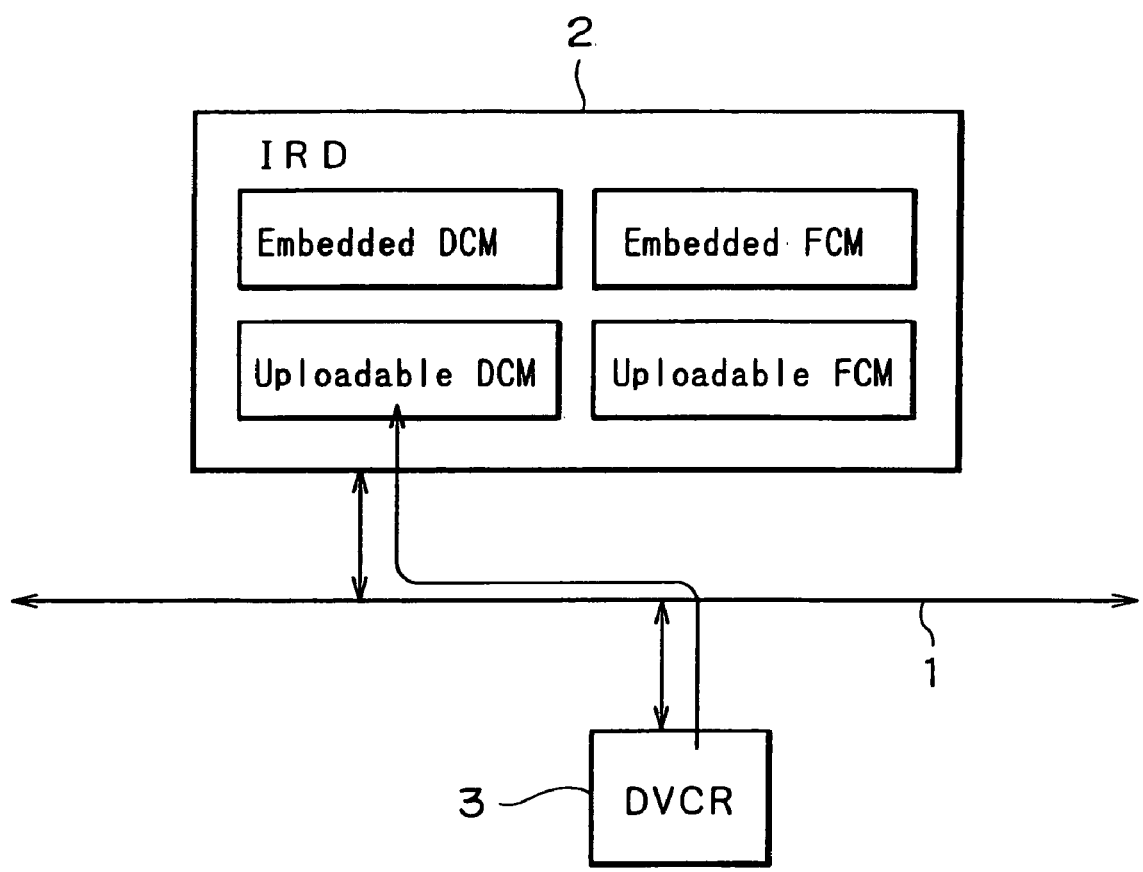
FIG. 5 is a diagram illustrating a DCM and FCM upload operations.

As shown in FIG. 5, The IRD 2 is installed at factory with the embedded DCM and FCM for the DVCR 3 which are listed in the version management table. Moreover, if a bus reset occurs when the DVCR 3 is connected to the same network or the DVCR 3 connected to the network is powered on, the IRD 2 uploads uploadable DCMs and uploadable FCMs having different versions from the DVCR 3 and stores the uploaded DCMs and FCMs in the version management table.

Figure 6:
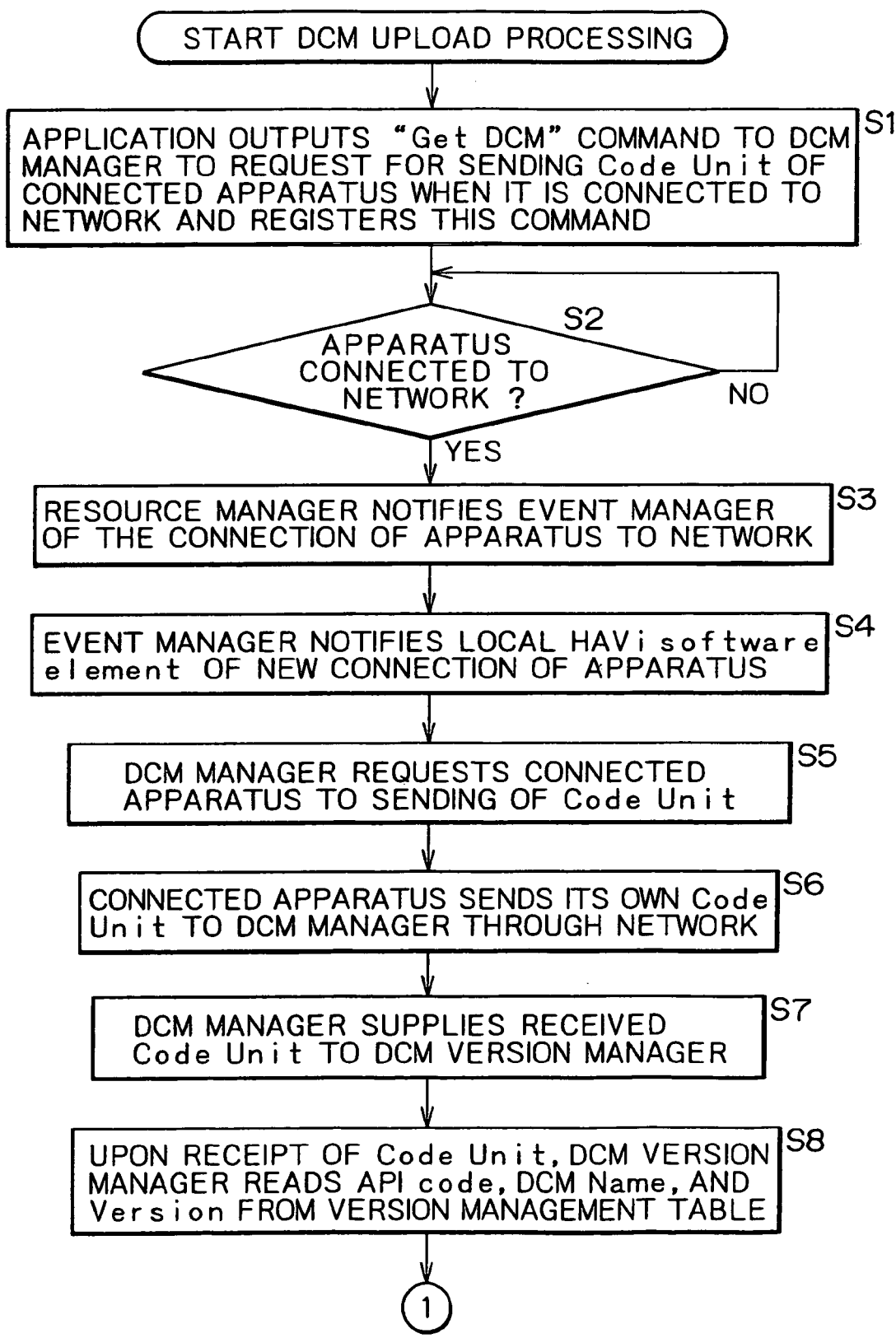
FIG. 6 is a flowchart describing DCM upload processing.
Figure 7:
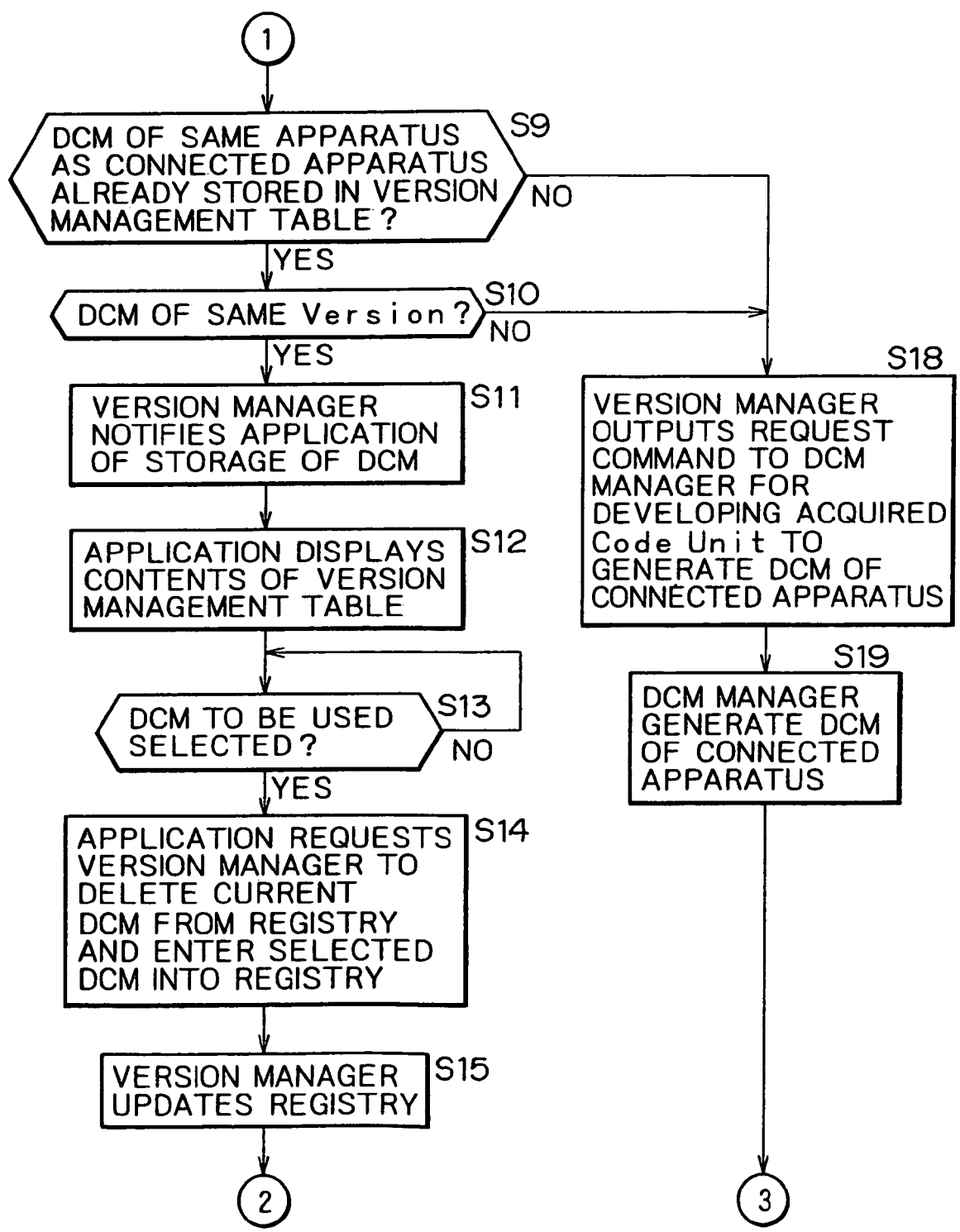
FIG. 7 is a flowchart continued from the flowchart shown in FIG. 6.
Figure 8:
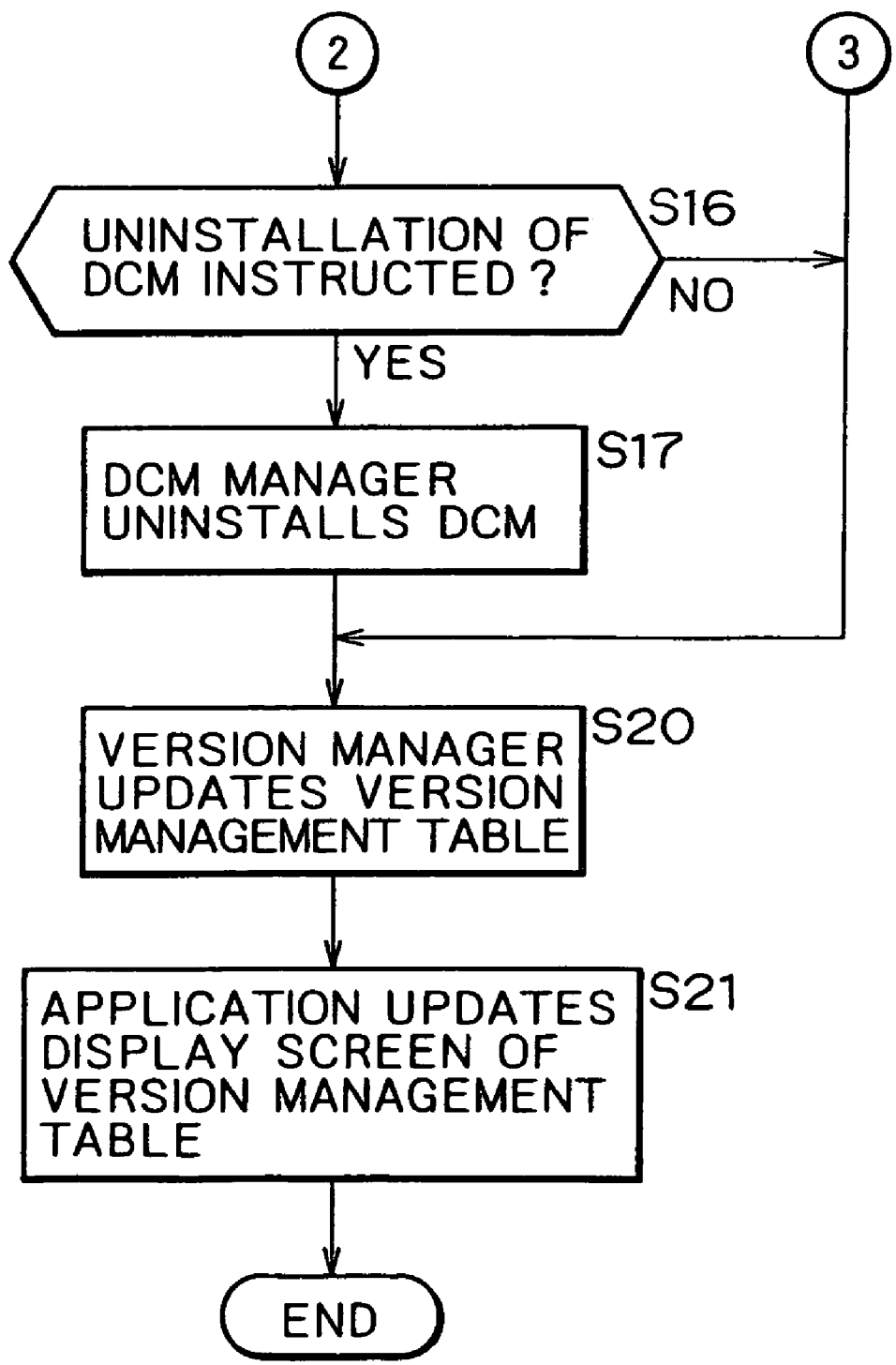
FIG. 8 is a flowchart continued from the flowcharts shown in FIGS. 6 and 7.

The following describes DCM upload processing to be executed by the IRD 2 with reference to the flowcharts shown in FIGS. 6 through 8. It should be noted that each software module in the software stack shown in FIG. 4 is read from the hard disk 30 into the RAM 25 to be executed by the CPU 23.

In step S1, the application outputs a Get DCM command to the DCM manager requesting the sending of a code unit (when the code unit is developed, a DCM is generated) of an apparatus when it is connected to the IEEE 1394 serial bus 1 (namely, the network) and registers this command.

In step S2, the resource manager determines whether an apparatus (for example, the DVCR 3) has been connected to the network. If the apparatus is found connected, the resource manager notifies the event manager of this connection in step S3.

In step S4, receiving the notification from the resource manager, the event manager notifies a local HAVi software element of the connection of the new apparatus.

In step S5, receiving the notification of the apparatus connection, the DCM manager requests the DVCR 3 through the IEEE 1394 serial bus 1 for sending a code unit. The code unit contains a source code program for generating DCMs and user interface information (data driven interaction) for example.

In step S6, the DVCR 3 (or the CPU 53) receives the request from the DCM manager and sends the code unit of its own to the DCM manager. In step S7, receiving the response (namely the code unit) from the DVCR 3, the DCM manager supplies its code unit to the DCM version manager.

In step S8, receiving the code unit from the DCM manager, the DCM version manager reads an API code and its DCM name and version from the version management table stored in the hard disk 30.

The version management table stores the DCM information constituted by API code, DCM name, version, and status as shown in FIG. 9. If there are identical API codes, it indicates that there are plural DCMs uploaded from a same apparatus and of different versions. These same API codes can be distinguished by their DCM names and versions. Status in the table indicates whether that DCM is currently set to the registry or not. If the status is active, it means that the DCM is currently set to the registry; if the status is NonActive, it means that the DCM is not set the registry. Consequently, in the example shown in FIG. 9, the DCM of which API code is 0x000e, DCM name is SONY (trademark) ZZZ, and version is 1.12 is currently set to the registry.

Referring to FIG. 7, in step S9, the version manager checks the version management table for the DCM information of the DVCR 3, or determines whether the API code is the same. If the DCM information of the DVCR 3 is found in the table, the process goes to step S10.

In step S10, the version manager compares the DCM information in the code unit returned from the DVCR 3 with the DCM information stored in the version management table for duplication, namely, determines whether a DCM having the same version.

If the DCM information corresponding to the DCM information in the code unit is not found in the version management table in step S10 or if, in step S9, the DCM information of the DVCR 3 has not yet been stored in the version management table, the process goes to step S18.

In step S18, the version manager outputs a request command to the DCM manager to develop the acquired code unit to generate a DCM of the connected apparatus (in this example, the DVCR 3).

In step S19, on the basis of the request from the version manager, the DCM manager develops the source code contained in the code unit supplied from the DVCR 3 to generate a new DCM (by executing normal DCM installation processing), upon which the process goes to step S20.

If, in step S10, the DCM information corresponding to the DCM information in the code unit is found stored in the version management table, then the process goes to step S11, in which the version manager notifies the application that the DCM information of the DVCR 3 has already stored in the version management table. In step S12, notified by the version manager, the application displays the contents of the version management table on the LCD 29. Consequently, a GUI as shown in FIG. 10 for example is displayed.

Figure 10:
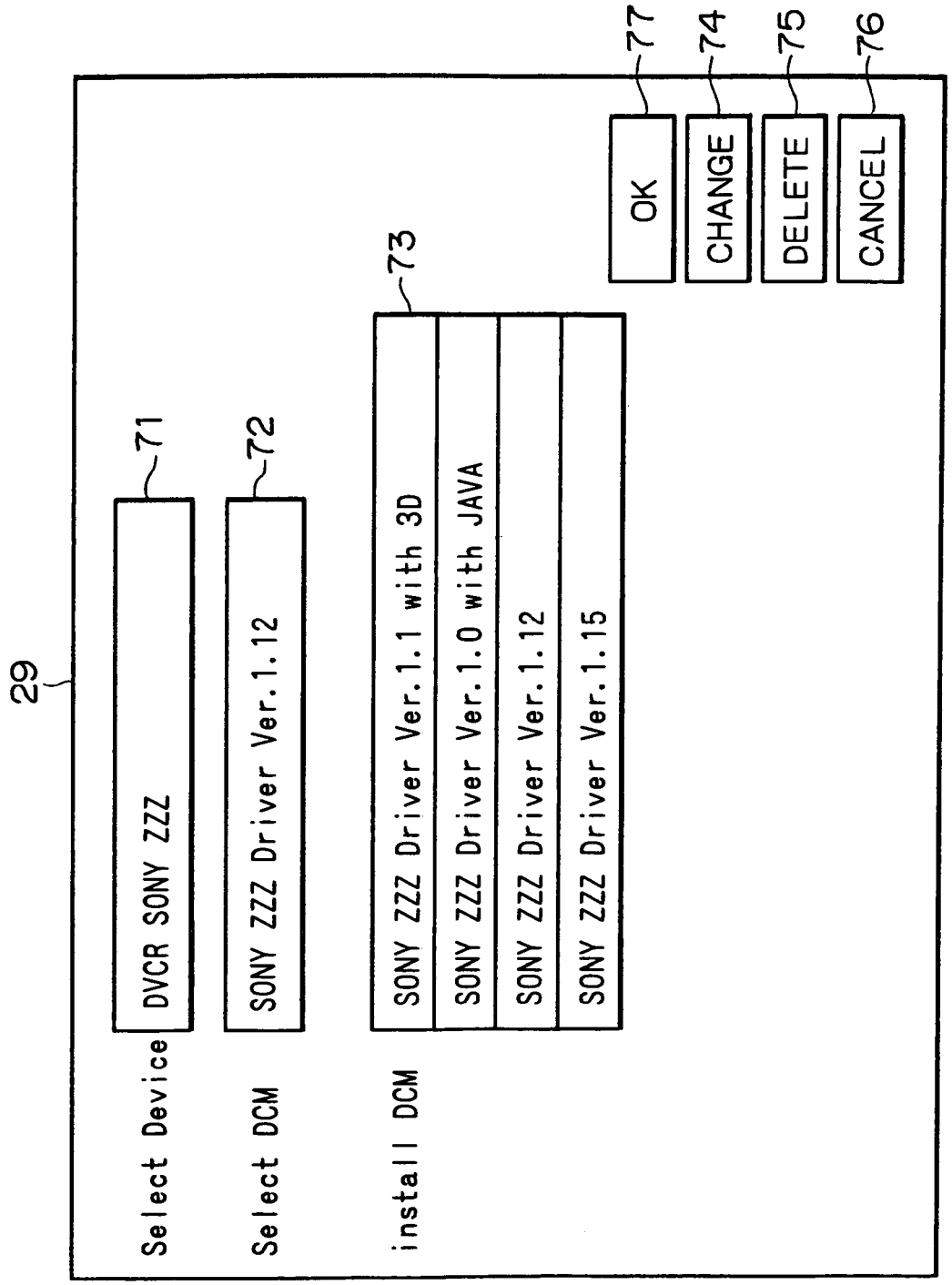
FIG. 10 is a diagram illustrating a GUI displayed on a LCD.

A display box 71 in FIG. 10 shows the apparatus name of the apparatus (namely the DVCR 3) connected this time. A display box 72 shows the DCM name currently set to the registry. A list box 73 displays all DCM names listed in the version management table. The user also can select a desired DCM by touching the corresponding position (in the display section) of the DCM names listed in the list box 73. Buttons 74 through 77, when touched (or pressed) by the user, change DCMs set the registry, delete (or uninstall) particular DCMs stored in the RAM 25, end the GUI displayed on the LCD 29, and confirm the change or deletion done.

It should be noted that the display box 71 is linked with a display box 81 or 82 to be displayed in a GUI shown in FIG. 12 to be described later (in this example, the display box 71 is linked with the display box 81) and the display box 72 and the list box 73 are linked with the DCM information in the version management table.

Referring to FIG. 7, in step S13, the application determines whether the DCM to be used has been selected by the user. Namely, the application determines whether the position of the DCM to be used has been touched by the user to select it from among the DCM names shown in the list box 73 and the button 74 has also been touched. If the DCM to be used is found unselected, the application waits until the DCM to be used is selected by the user. When the DCM to be used is found selected, the application requests in step S14 the version manager to delete the currently set DCM from the registry and enter the DCM selected in step S13 into the registry.

In step S15, on the basis of the request from the application, the version manager deletes the currently set DCM (the DCM set before step S13) from the registry. Then, the version manager enters (or registers) the DCM selected in step S13 into the registry. At this moment, the deleted DCM still remains in the RAM 25.

In step S16 shown in FIG. 8, the version manager determines whether the user has specified to uninstall a DCM in the list box 73, namely whether the user has selected a DCM name in the list box 73 and touched the button 75. If the uninstallation is found specified, the version manager requests the DCM manager to uninstall the specified DCM from the RAM 25, upon which the process goes to step S17.

In step S17, on the basis of the request from the version manager, the DCM manager uninstalls the specified DCM from the RAM 25, upon which the process goes to step S20.

It should be noted that, whether the change has been confirmed in step S13 or the uninstallation has been confirmed in step S16 can be determined by the pressing of the OK button 77. To cancel the change or uninstallation, the user presses the CANCEL button 76 after the CHANGE button 74 or the DELETE button 75 has been pressed.

If the uninstallation of the DCM deleted from the registry in step S15 is found unspecified in step S16, the process goes to step S20.

If the process comes to step S20 through step S19, the version manager enters the DCM information of the newly generated DCM into the version management table and updates the status of this DCM information to Active. Further, the version manager stores the newly generated DCM into the RAM 25 and sets this DCM to the registry. Consequently, every time a new DCM is generated, it is automatically selected and set to the registry.

In addition, in step S20, the version manager updates the status of the newly generated DCM from NonActive to Active in the version management table and updates the status of the DCM deleted from the registry in step S15 from Active to NonActive.

Further, in step S20, the version manager deletes, from the version management table, the DCM information of the DCM uninstalled in step S17.

After step S20, the version manager notifies the application of the update of the version management table.

In step S21, receiving the notification from the version manager, the application updates the GUI shown on the LCD 29 to a GUI that corresponds to the version management table updated in step S20, upon which the process comes to an end.

It should be noted that, if the changed display screen is to be ended, the OK button 77 may be pressed to return to the previous screen.

In the above mentioned configuration, the selection by the user of a DCM to be used is determined. Alternatively, the version manager may detect a DCM of the newest version from the DCM information stored in the version management table and automatically select the detected DCM, by way of example.

In the above-mentioned configuration, the DCM information is retrieved from the network. Alternatively, the DCM information may be retrieved from any predetermined recording medium on which this DCM information is recorded.

Figure 11:
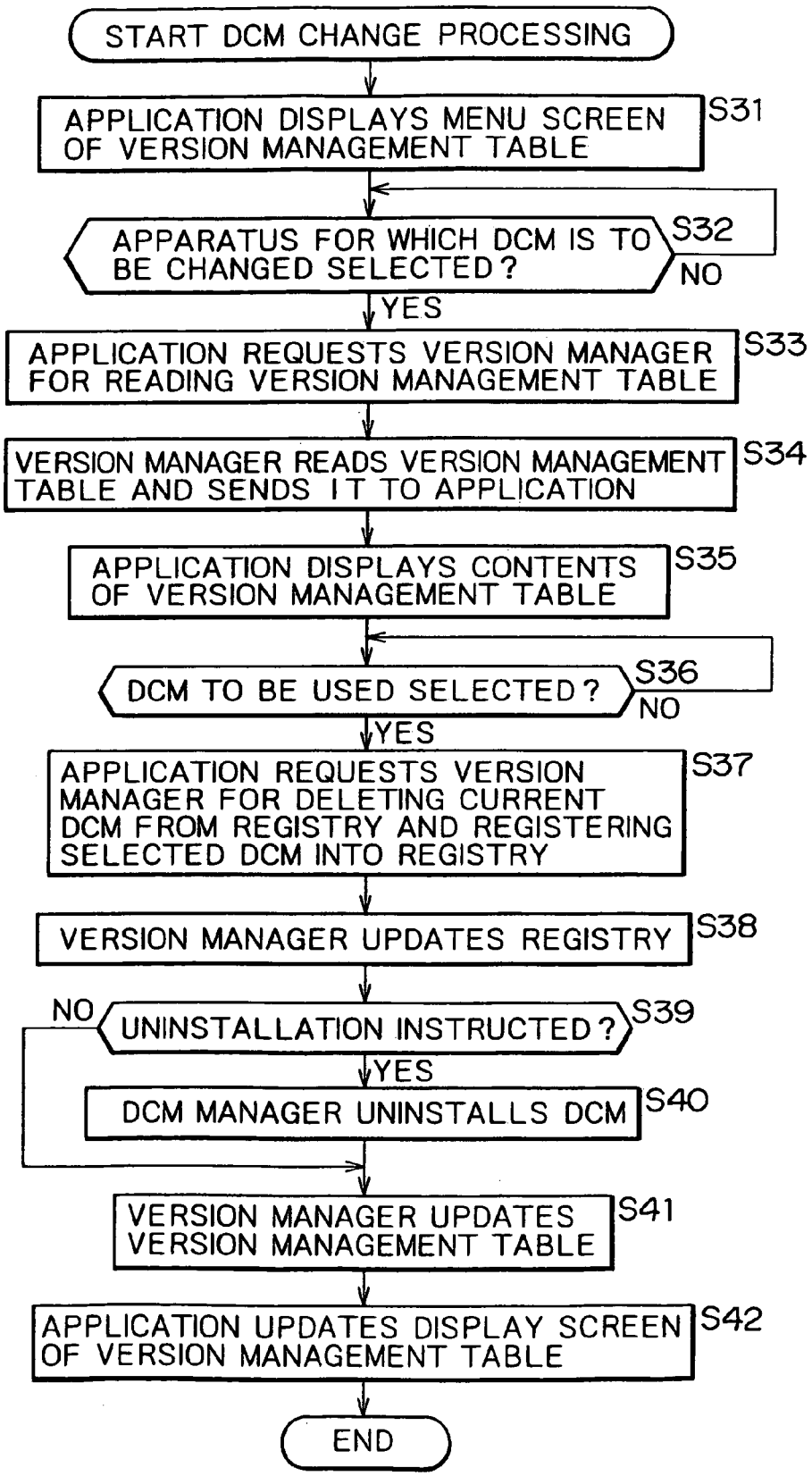
FIG. 11 is a flowchart describing DCM change processing.
Figure 16:
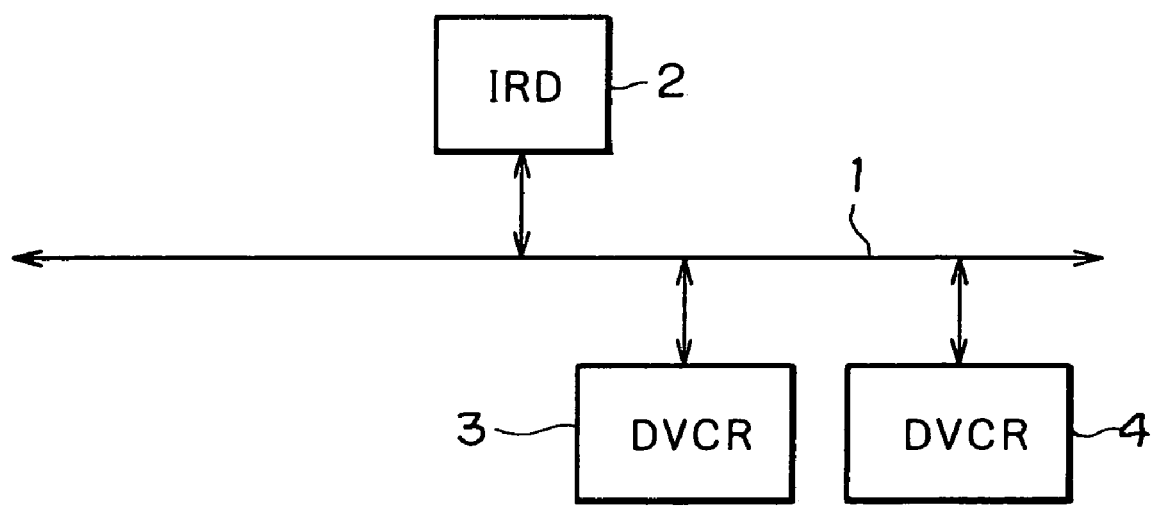
FIG. 16 is a block diagram illustrating an apparatus connection state for the description of DCM change processing executed manually.

So far, the DCM change processing to be executed when an apparatus under control is connected has been described. The following describes DCM change processing to be manually executed by the user will be described with reference to the flowchart shown in FIG. 11. It should be noted that an apparatus connection state in which the IRD 2, the DVCR 3, and the DVCR 4 are connected to the IEEE 1394 serial bus 1 is assumed as shown in FIG. 16. The RAM 25 of the IRD 2 stores one or more DCMs of the DVCR 3 and the DVCR 4. The version management table is assumed to list their DCM information. This processing is started when the user inputs a DCM change command.

Figure 12:
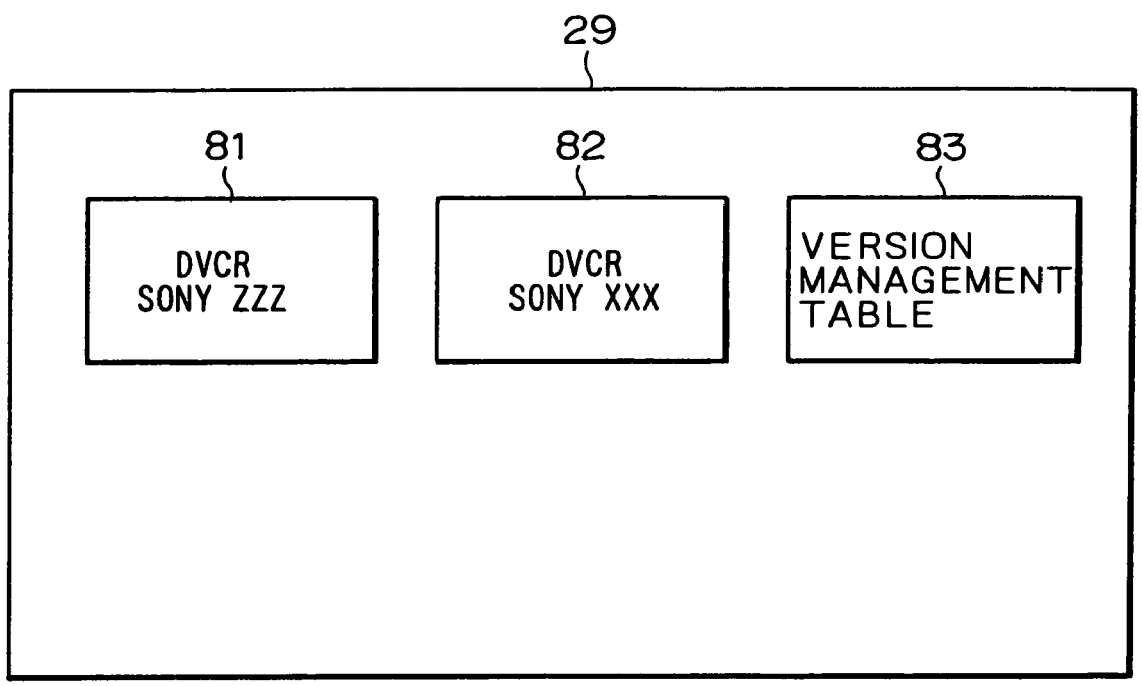
FIG. 12 is a diagram illustrating a GUI displayed on a LCD.

When the user specifies a DCM change, the application accordingly reads the menu screen of the version management table from the hard disk 30 in step S31 and displays a GUI as shown in FIG. 12 for example.

A display box 81 shown in FIG. 12 shows an apparatus name indicative of the DVCR 3 and a display box 82 shows an apparatus name indicative of the DVCR 4 (FIG. 16). When the user touches (namely selects) the display box 81 or 82 and then a setting button 83, the version management table of the apparatus corresponding to the selected display box 81 or 82 is read.

It should be noted that the apparatus name shown in the display box 81 or 82 is set on the basis of the specifications information which is supplied to the controlling apparatus (the IRD 2) when the controlled apparatus (the DVCR 3 for example) is connected to the IEEE 1394 serial bus 1. The user can change the setting of the apparatus name as desired.

In step S32, the application determines whether the user has selected the apparatus of which DCM is to be changed. If the apparatus is found not selected, the application waits until the apparatus is selected, with the GUI shown in FIG. 12 kept displayed without change. When the apparatus is selected by the user, the process goes to step S33. It is assumed here that the apparatus selected by the user be the DVCR 3. Namely, it is assumed that the display box 81 is touched by the user and then the setting button 83.

In step S33, the application requests the version manager for reading the version management table. In step S34, on the basis of the request from the application, the version manager reads the version management table of the DVCR 3 stored in the hard disk 30 and sends it to the application.

In step S35, the application displays the version management table on the LCD 29 (FIG. 10). In step S36, the application determines whether the touch pad 28 has been operated by the user and the DCM to be used has been selected by the user. If the DCM to be selected is found unselected, the application waits until the DCM to be used is selected. When the DCM to be used is selected by the user, the process goes to step S37, in which the application requests the version manager to delete the currently set DCM from the registry and enters the DCM selected in step S36 into the registry. Assume that DCM name SONY ZZZ Driver Ver. 1.15 has been selected by the user.

In step S38, on the basis of the request from the application, the version manager deletes the currently set DCM (the DCM of SONY ZZZ Driver Ver. 1.12 set before step S36) from the registry. Further, the version manager sets the selected DCM (in this example, SONY ZZZ Driver Ver. 1.15) to the registry.

In step S39, the version manager determines whether the touch pad 28 has been operated by the user to specify the uninstallation of the DCM from the list box 73. If the uninstallation is found specified, the version manager requests the DCM manager to uninstall the DCM specified for deletion from the RAM 25 and the process goes to step S40. On the basis of the request from the version manager, the DCM manager uninstalls the DCM specified for deletion (in this example, SONY ZZZ Driver Ver. 1.12) from the RAM 25 and the process goes to step S41.

If, in step S39, the uninstallation of the DCM (in this example, SONY ZZZ Driver Ver. 1.12) in the list box 73 is found not specified, the process goes to step S41.

In step S41, if the process comes here by skipping step S40, the version manager updates the status in the version management table of the newly selected DCM (in this example, SONY ZZZ Driver Ver. 1.15) from NonActive to Active and updates the status of the DCM (in this example, SONY ZZZ Driver Ver. 1.12) deleted from the registry in step S38 from Active to NonActive (FIG. 13).

If the processes comes to step S41 through step S40, the version manager updates the status in the version management table of the newly selected DCM (in this example, SONY ZZZ Driver Ver. 1.15) from NonActive to Active and deletes the DCM information of the DCM (in this example, SONY ZZZ Driver Ver. 1.12) uninstalled from the RAM 25 in step S40 (FIG. 14).

After step S41, the version manager notifies the application of the update of the version management table.

Figure 15:
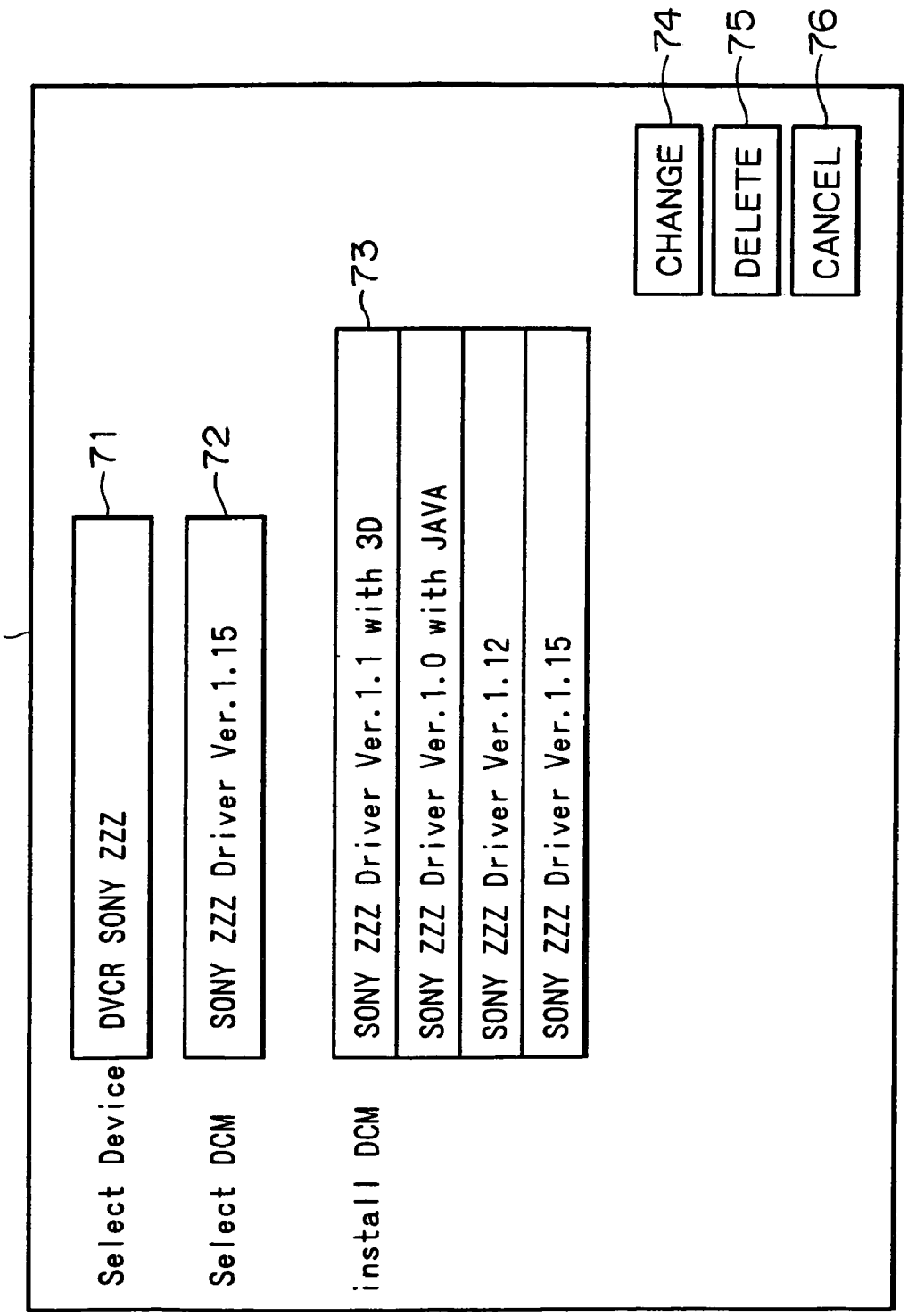
FIG. 15 is a diagram illustrating a GUI displayed on a LCD.

In step S42, receiving the notification from the version manager, the application updates the GUI displayed on the LCD 29 to a GUI corresponding to the version management table updated in step S41 (FIG. 15), upon which the process comes to an end.

Thus, storing the information such as the updated DCM and DCM version from the DVCR 3 of the controlled apparatus (BAV) into the version management table of the IRD 2 of the controlling apparatus (FAV) allows the user to specifically manage the version of the DCM for controlling that apparatus. Namely, the present invention provides the following advantages:

(1) The user can perform apparatus control while viewing an accustomed, familiar screen if the OS of a controlled apparatus has been upgraded.

(2) The user can manage plural control functions having different versions for a single apparatus.

The above description has been made by use of the management of the version of the DCM of the DVCR 3 for example. The present invention is also applicable to any other electronic apparatuses that can be controlled.

The software for executing the above-mentioned sequence of processing operations is provided by a computer in which the programs constituting this software are installed in a dedicated hardware apparatus or the software is installed from a recording medium into a general-purpose personal computer for example capable of executing various functions by the installed programs.

This recording medium includes not only the hard disk 30 storing the programs provided as already built in the IRD 2, but also such package media recording the programs as the magnetic disc 41 (including a floppy disc), the optical disc 42 (including CD-ROM (Compact Disc Ready Only Memory) or DVD (Digital Versatile Disc), a magneto-optical disc 43 (including MD), and the semiconductor memory 44 which are distributed to users.

The steps describing each program recorded in the recording medium herein include not only the processes which are executed in a time-series manner by following a written procedure, but also the processes which are executed in parallel or discretely.

A system herein denotes an entire apparatus composed of two or more apparatuses.

As described and according to the invention, the information processing apparatus, the information processing method, and the programs recorded on a recording medium retrieve plural pieces of information associated with controlling other electronic apparatuses, store the retrieved plural pieces of information, select a desired piece of information from these plural pieces of information, register the selected information as only the information that can control other electronic apparatuses on a network, and control other electronic apparatuses on the basis of the registered information. This novel constitution allows the user to control electronic apparatuses by use of desired apparatus control modules and specifically manage the versions of these apparatus control modules.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus for controlling other electronic apparatus through a network, said information processing apparatus comprising:

retrieving means for retrieving an information unit from said other electronic apparatus, wherein said information unit includes a source code program for generating a control software module for controlling said other electronic apparatus and related information associated with said control software module including an identifier and version information of said control software module;

generating means for generating said control software module from said source code program;

storage means for storing an embedded control software module for controlling over said other electronic apparatus, originally embedded in said information processing apparatus with related information and different versions of a plurality of said control software modules generated by said generating means and said related information retrieved by said retrieving means;

selecting means for selecting a particular version of a desired control software module from among said plurality of said control software modules stored in said storage means including said embedded control software module on the basis of said identifier and said version information included in said related information stored in said storage means;

registration means for registering a control software module selected by said selecting means as only information that can control said other electronic apparatus on said network; and control means for controlling said other electronic apparatus on the basis of said desired control software module registered by said registration means.

2. The information processing apparatus according to claim 1, further comprising:

display control means for controlling a display of said plurality of said control software modules stored in said storage means.

3. The information processing apparatus according to claim 1, wherein said storage means comprises:
information distinguishing means for distinguishing said desired control software module selected by said selecting means from other information not selected by said selecting means.

4. The information processing apparatus according to claim 1, further comprising:
deletion determining means for determining whether to delete said desired control software module; and
deleting means for deleting said desired control software module if the same is determined for deletion by said deletion determining means.

5. The information processing apparatus according to claim 1, wherein said retrieving means retrieves said information associated with control of other electronic apparatus from a predetermined recording medium in accordance with a predetermined procedure.

6. The information processing apparatus according to claim 1, wherein said retrieving means retrieves said information associated with control of other electronic apparatus from other electronic apparatus in accordance with a predetermined procedure.

7. The information processing apparatus according to claim 6, wherein said predetermined procedure is executed when one of a plurality of events takes place, said plurality of events being connected to other electronic apparatus of said network and occurrence of a bus reset.

8. The information processing apparatus according to claim 1, wherein said selecting means executes a selecting operation when one of a plurality of events takes place, said plurality of events being connected to other electronic apparatus of said network and occurrence of a bus reset.

9. The information processing apparatus according to claim 8, wherein said selecting means selects information having a most recent version as said desired control software module from among said plurality of said device control modules stored in said storage means.

10. The information processing apparatus according to claim 1, wherein said retrieving means comprises:
determination means for determining an identification code of said desired control software module;
wherein, if said identification code is found a new identification code, said retrieving means retrieves said information.

11. The information processing apparatus according to claim 10, wherein said identification code is an application programming interface code.

12. The information processing apparatus according to claim 10, wherein said identification code is a version name.

13. An information processing method for an information processing apparatus for controlling other electronic apparatus through a network, said method comprising the steps of:
retrieving an information unit from said other electronic apparatus, wherein said information unit includes a source code program for generating a control software module for controlling said other electronic apparatus and related information associated with said control software module including an identifier and version information of said control software module;
generating said control software module from said source code program;
storing an embedded control software module for controlling over said other electronic apparatus, originally embedded in said information processing apparatus with related information and different versions of a plurality of said control software modules generated by said generating step and said related information retrieved by said retrieving step;
selecting a particular version of a desired a control software module from among said plurality of said control software modules stored in said storage step including said embedded control software module on the basis of said identifier and said version information included in said related information stored in said storage step;
registering a control software module selected by said selecting step as only information that can control said other electronic apparatus on said network; and
controlling said other electronic apparatus on the basis of said desired control software module registered in said registration step.

14. A recording medium having a computer-readable program stored thereon for executing an information processing method for controlling other electronic apparatus through a network, said method comprising the steps of:
retrieving an information unit from said other electronic apparatus, wherein said information unit includes a source code program for generating a control software module for controlling said other electronic apparatus and related information associated with said control software module including an identifier and version information of said control software module;
generating said control software module from said source code program;
storing an embedded control software module for controlling over said other electronic apparatus, originally embedded in said information processing apparatus with related information and different versions of a plurality of said control software modules generated by said generating step and said related information retrieved by said retrieving step;
selecting a particular version of a desired a control software module from among said plurality of said control software modules stored in said storage step including said embedded control software module on the basis of said identifier and said version information included in said related information stored in said storage step;
registering a control software module selected by said selecting step as only information that can control said other electronic apparatus on said network; and
controlling said other electronic apparatus on the basis of said desired control software module registered in said registration step.

* * * * *